United States Patent
Oster

(10) Patent No.: US 6,733,270 B2
(45) Date of Patent: May 11, 2004

(54) DEVICE FOR SHAPE-FORMING RECESSES IN FILM-TYPE MATERIAL

(75) Inventor: Heinz Oster, Feuerthalen (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 278 days.

(21) Appl. No.: 09/862,675

(22) Filed: May 22, 2001

(65) Prior Publication Data

US 2001/0053394 A1 Dec. 20, 2001

(30) Foreign Application Priority Data

Jun. 16, 2000 (EP) .......................... 00810528

(51) Int. Cl.[7] .............................. B29C 51/04
(52) U.S. Cl. ............. 425/355; 425/394; 425/398; 425/400; 425/408; 425/DIG. 48
(58) Field of Search .................. 425/394, 344, 425/346, 355, 406, 408, DIG. 48

(56) References Cited

U.S. PATENT DOCUMENTS

| | | | |
|---|---|---|---|
| 1,668,349 A | | 5/1928 | Baum |
| 2,484,656 A | | 10/1949 | Sikka et al. |
| 3,584,109 A | | 6/1971 | Meadors et al. |
| 4,127,378 A | | 11/1978 | Meadors |
| 4,225,553 A | * | 9/1980 | Hirota et al. ............... 264/292 |
| 4,484,703 A | | 11/1984 | Kawasaki et al. |
| 4,832,676 A | | 5/1989 | Johns et al. |
| 6,135,755 A | * | 10/2000 | Zeiter et al. ................ 425/394 |

FOREIGN PATENT DOCUMENTS

| | | |
|---|---|---|
| DE | 706 023 | 5/1941 |
| DE | 39 30 603 | 3/1990 |
| EP | 0 779 143 | 6/1997 |
| EP | 0 905 042 | 3/1999 |
| EP | 0 987 094 | 3/2000 |
| JP | 6-55623 | 3/1994 |
| JP | 11-314616 | * 11/1999 |
| WO | 95/01255 | 1/1995 |
| WO | 99/08857 | 2/1999 |

OTHER PUBLICATIONS

Flimm et al.: "Spanlose Formgebung" DE, Munchen, Carl Hanser Verlag, pp. 234–249 XP 002107154, 1984.

* cited by examiner

Primary Examiner—Robert Davis
Assistant Examiner—Thu Khanh T. Nguyen
(74) Attorney, Agent, or Firm—Bachman & LaPointe, P.C.

(57) ABSTRACT

A device for shape-forming at least one recess in a film-type material features a die with at least one opening, at least one shaping stem that can be introduced into the opening to create the recess by shape-forming, and a clamping facility for holding the film-type material fast between the clamping facility and the die. Counter-stems which are displaceable at least within the die openings are situated in the die, whereby shape-forming regions of the shape forming stems and the counter-stems for clamping the film-shaped material are, at least in part, superimposed on each other.

13 Claims, 3 Drawing Sheets

DEVICE FOR SHAPE-FORMING RECESSES IN FILM-TYPE MATERIAL

BACKGROUND OF THE INVENTION

The invention relates to a device for shape-forming at least one recess in a film-type material, said device featuring a die with at least one opening, at least one shaping stem that can be introduced into the opening to create the recess by shape-forming and a clamping facility for holding the film-type material fast between the clamping facility and the die.

It is known to manufacture base parts of blister packs, also called push-through packs, or other packaging containers with recesses or cups to accommodate contents, by means of deep-drawing, stretch-drawing or thermo-forming methods. These types of packaging may be made from thermoplastics or film-type composites, or laminates such as aluminum foils laminated with plastic films, or extrusion-deposited layers of thermoplastics.

If the packaging is made from metal-containing laminates, the manufacturing process may be performed using tools comprising stems, dies and clamping facilities. During the shape forming operation, the laminate is clamped fast between the die and the clamping facility. In order to create the desired recess or cup, the laminate is pushed into the die opening by the stem, whereby the laminate is deformed by local elongation. The result is that a shaped part exhibiting one or more recesses is formed out of the originally flat laminate.

In order to be able to exploit the elongation properties of the material to be thus formed, and hence to achieve recesses with a good deepening ratio i.e. large depth and small diameter, it is known from EP-A-0779143 to carry out the cold-forming deepening of metal-containing laminates in two steps. Using a first stem with a shape-forming surface of high coefficient of friction, the metal-plastic composite is pre-formed and then formed into its final shape using a second stem with a shape-forming surface of low coefficient of friction. This procedure suffers the disadvantage that two different stems have to be employed one after the other and therefore calls for a high degree of precision with respect to the positioning of both stems. In another variant, a telescopic type of two part stem is employed instead of two different stems. These stems are however complicated in design and cannot be employed for forming all the standard kinds of laminate.

SUMMARY OF THE INVENTION

The object of the present invention is therefore to provide a device of the kind mentioned above by means of which two-stage forming can be employed for deepening purposes, achieving a good deepening ratio in a simple manner.

That objective is achieved by way of the invention in that counter-stems which are displaceable at least within the die openings are situated in the die, whereby shape-forming regions of the forming stems and the counter-stems for clamping the film-shaped material can, at least in part, be superimposed on each other.

The arrangement of a shaping stem and a counter-stem according to the invention offers the significant advantage over the state-of-the-art that, in a simple manner, using two successive forming steps to create a recess or cup, first the potential for forming the base part and then the potential for forming the side walls, or vice versa, can be exploited.

In a preferred device according to the invention the counter-stems are positioned on a piston that can be displaced into the die along the forming axis.

The surface of the forming region of the shaping stem and/or the counter-stem may locally exhibit different coefficients of friction. Because of this the friction between the shaping stem or the counter-stem and the film to be shape-formed can be adjusted such that the sliding behavior of the film on the shaping surface of the shaping stem and the counter-stem can be influenced during the forming process.

The coefficient of friction of the shaping surface of the shaping stem and the counter-stem can be adjusted such that either stem is made of the appropriate material or features a corresponding coating.

A low coefficient of friction is obtained e.g. using materials such as polytetrafluorethylene, polyoxymethylene (polyacetal, POM), polyethylene or polyethylene-terephthalate, or mixtures thereof. Other materials than plastics may be considered e.g. metals such as aluminum or chrome steel, in particular also with polished surfaces. Further usable materials are e.g. ceramic layers or coatings containing graphite, boron nitride or molybdenum-sulphide.

Materials that may be employed to produce surfaces with high coefficients of friction are e.g. metals such as steel, or plastics such as polyacetal (POM), polyethylene, rubber, hard rubber or caoutchouc, including acrylic polymers. The metal surfaces may be given higher coefficients of friction e.g. by roughening.

The outer part of the forming and counter stems in the regions of the surfaces effecting the forming may be different in shape depending on the desired shape of recess or cup. In the simplest case the shaping and counter-stems are cylindrical in shape and exhibit flat bases; however, other three-dimensional shapes such as e.g. conical, pyramid, blunted cone, blunted pyramid, segments of spheres or a drum-shape are possible. At the same time, the counter-stem may also have a corresponding shape that fits to the shaping stem.

The shaping stem and/or the counter-stem may also be in two parts with a hollow cylindrical outer stem part and an inner stem part that can be slid in a telescopic manner out of the outer stem part.

In a preferred version of the device according to the invention, near a clamping area at the edges of the openings of the die and the clamping device, both the die and the clamping device exhibit a substrate of material of low coefficient of friction for guiding the film. This insures that the edge of the recess is uniformly formed and pore-free.

The device according to the invention is particularly suitable for producing recesses in a plastic-coated metal foil by means of cold forming, for example for manufacturing the bases for blister packs.

For the purposes of shape-forming with the device according to the invention, suitable metal-plastic composite films have e.g. a metal foil of 8 to 150 $\mu$m, preferably 20 to 80 $\mu$m. Suitable metals are e.g. steel, copper and aluminum. Preferred foils of aluminum are e.g. of 98% purity or higher, whereby in particular one may employ aluminum foils of alloys of the AlFeSi or AlFeSiMn type.

The plastics employed may be e.g. layers, films or laminate films of thermoplastics of the polyolefin, polyamide, polyester and polyvinylchloride series, whereby the films and film laminates may also be uniaxially or biaxially stretched. Typical examples of thermoplastics from the polyolefin series are polyethylenes, such as MDPE, HDPE, uniaxially and biaxially stretched polyethylenes, polypropylenes such as cast polypropylenes and uniaxially or biaxially stretched polypropylenes, or polyethylene-terephthalate from the polyester series. The thickness of the thermoplastic layer, in the form of a layer, film or film laminate, in the metal-plastic composite film may be e.g. 12 to 100 μm, preferably 20 to 60 μm.

The metal foils and the thermoplastics may e.g. be joined together by laminate bonding, colandering or extrusion bonding into composites. To join the layers, one may employ, from case to case, laminate bonding and bonding agents, and the surfaces to be joined may be modified by a plasma, corona or flame pre-treatment.

Examples of metal-plastic composite films that can be employed may have a first layer e.g. a film or laminate made up of the above mentioned thermoplastics, a second layer in the form of a metal foil and a third layer, e.g. a film or film laminate or an extruded layer made of the above mentioned thermoplastics. Further layers such as sealing layers may be fore-seen.

The metal-plastic composite films may exhibit on at least one of its outer facing sides or on both outer facing sides a sealing layer in the form of a sealable film or sealing lacquer. The sealing layer is situated, for reason of its function, in the outermost layer of the composite laminate. In particular, a sealing layer may be on the outside of the composite, whereby in the case of a blister pack this sealing layer should be facing the contents side in order to perform the sealing on of the lid film or the like.

Typical examples in practice of metal-plastic composite films that are formable using the device according to the invention are:
oPA25/Al45/PVC60
oPA25/Al45/oPA25
Al120/PP50
oPA25/Al60/PE50
oPA25/Al60/PP60
oPA25/Al45/PVC100
oPA25/Al60/PVC60
oPA25/Al45/PVC, PE-coated
oPA25/Al45/cPA25
oPA25/Al60/PVC100
oPA25/Al60/oPA25/EAA50
where oPA stands for oriented polyamide, cPA for cast polyamide, PVC for polyvinylchloride, PE for polyethylene, PP for polypropylene, EAA for ethyl-acrylic acid and Al for aluminum, and the numbers represent the thickness in μm of the layers or films.

BRIEF DESCRIPTION OF THE DRAWINGS

Further advantages, features and details of the invention are revealed in the following description of preferred exemplified embodiments and with the aid of the accompanying drawings which show schematically.

DETAILED DESCRIPTION OF PREFERRED EMBODIMENTS

Figure 1:
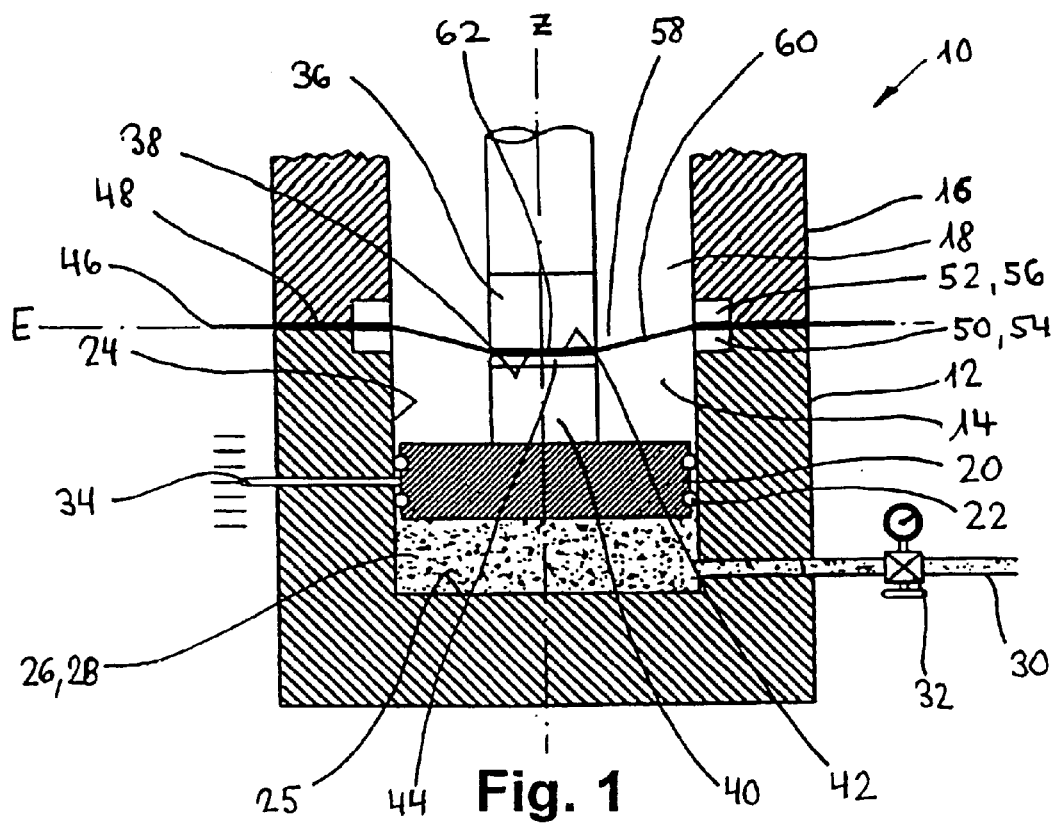
FIG. 1 a cross-section through a shaping station with a die with an opening.

In FIG. 1 a shaping station 10 features a die 12 with an opening 14 and a clamping device 16 with clamp opening 18. Situated in the die 12 is a piston 20 which is sealed off in a fluid-tight manner against the inner wall 22 of the die 12 by means of seals 22 and delimits with respect to the base 25 of the die 12 a cylindrical space 26, which can be filled with hydraulic fluid 28 via pipeline 30. The movement of the piston 20 along the direction of its z axis is controlled via a valve 32 situated in the pipeline 30. Depending on its function, the piston 20 can be pressure-controlled and/or distance-controlled by way of the valve 32. The distance control is symbolized in the drawing by a distance display 34. Of course the piston movement may also be effected by means of other means e.g. mechanical means instead of hydraulic means.

A distance-controlled shaping stem 36 penetrates the clamp opening 18 and can be moved in and out of the die opening 14 along a displacement axis z which coincides with the axis of the piston 20. The base 42 of a counter-stem 40 mounted above the piston 20 lies facing the base 38 of the shaping stem along the direction of displacement z and can be advanced into the clamp opening 18. The base 42 of the counter-stem 40 is covered with a coating 44 e.g. made of rubber.

A metal-plastic composite film 46 is held under force in a clamping region 48 between the die 12 and the clamping device 16. Next to the clamping region 48 facing the openings 14 and 18 is a ring-shaped, stepped recess 50 and 52 respectively in the periphery of the die 12 and that of the clamping device 16. In the recesses 50, 52 is a ring-shaped insert 54 and 56 respectively made of a low-friction material. The film 46 slides between the inserts 54, 56.

The formation of a recess or cup 58 by shape-forming the film 46 clamped between the die 12 and the clamping device 16 is readily understood from FIG. 1. The film 46, lying initially in a plane E in which it is clamped, is plastically deformed as it is pressed by the shaping stem 36 into the die opening 14. In that process the recess 58 is formed with side wall 60 between shaping stem 36 and the inner wall 24 of the die and a base part 62 which corresponds to the base 38 and the shaping surface of the shaping stem 36.

Figure 2:
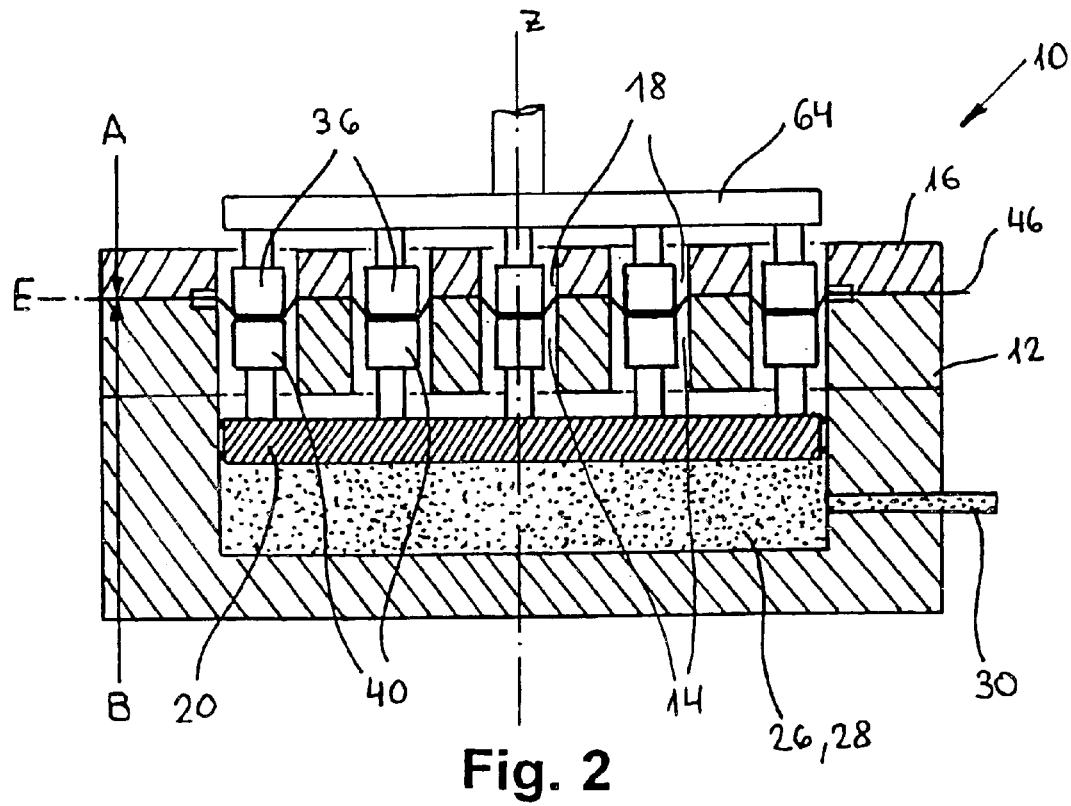
FIG. 2 a cross-section through a forming station with a die having a plurality of openings.
Figure 3:
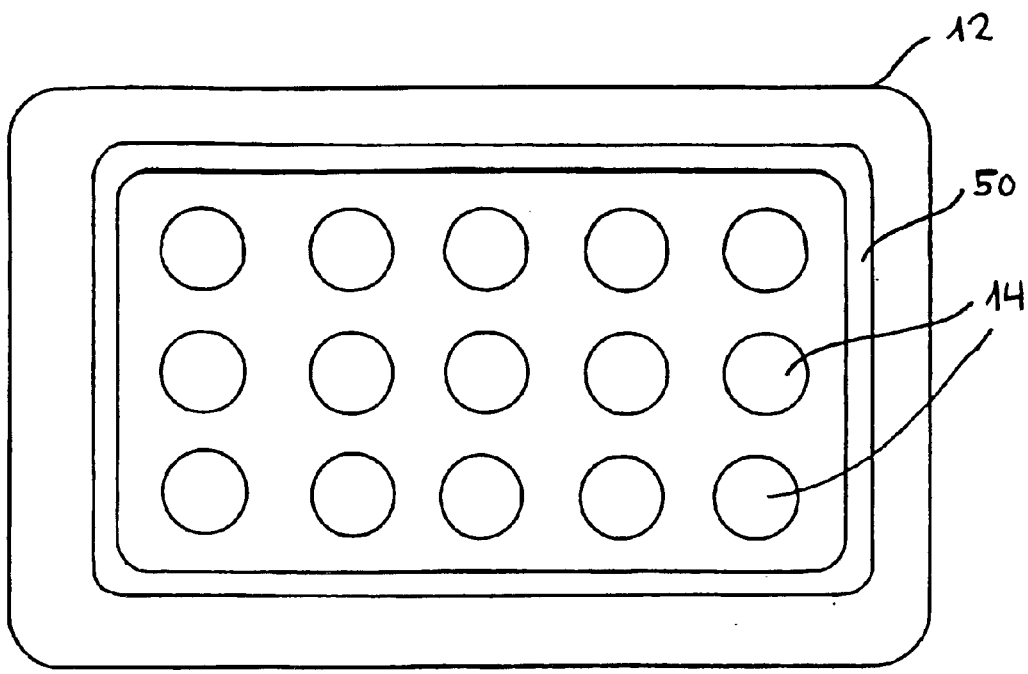
FIG. 3 a plan view of the die in FIG. 2, viewed in direction A.
Figure 4:
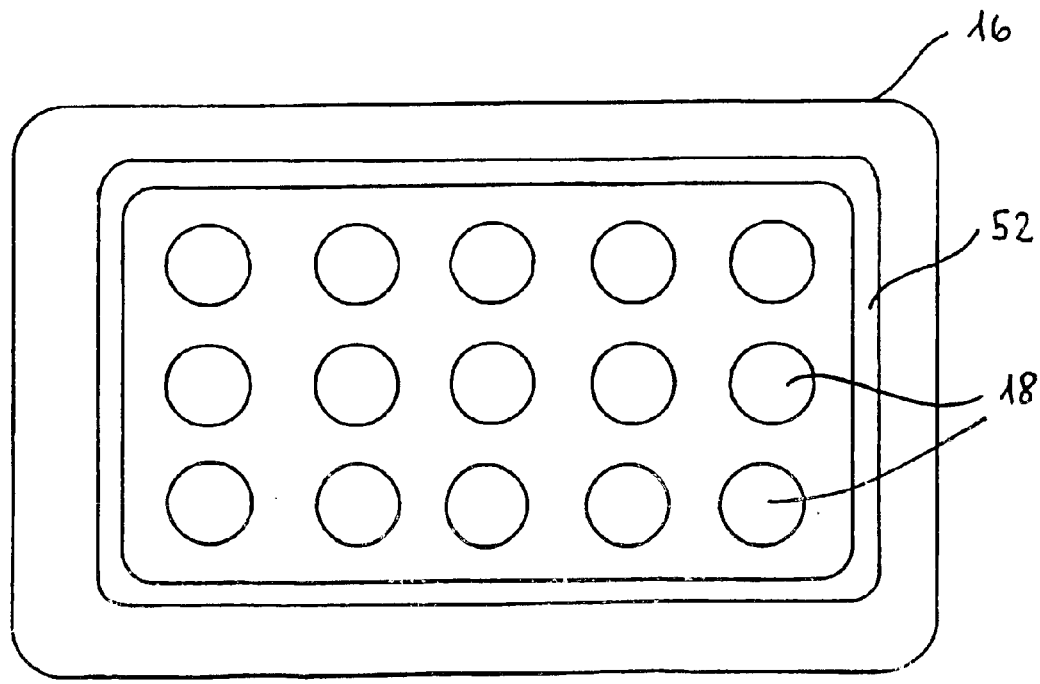
FIG. 4 a plan view of the clamping facility in FIG. 2, viewed in direction B.

The shaping station shown in FIGS. 2 to 4 differ from that in FIG. 1 in that the die 12 and the clamping device 16 feature a plurality of openings 14, 18, in the present case 15 openings, and a pair of shaping stems 36 and counter-stems 40 facing each pair of openings 14, 18. The shaping stems 36 are mounted on a support plate 64. Displacement of the support plate 64 in direction z leads to simultaneous displacement of all shaping stems 36. In the same manner all counter-stems 40 are mounted on a common piston 20 with the result that, on displacing the piston in the direction z, the counter-stems 40 are also displaced simultaneously. This forming station enables therefore the simultaneous formation of a number of recesses or cups 58 in the metal-plastic composite, corresponding to the number of shaping stems 36 and counter-stems 40.

Figure 5:
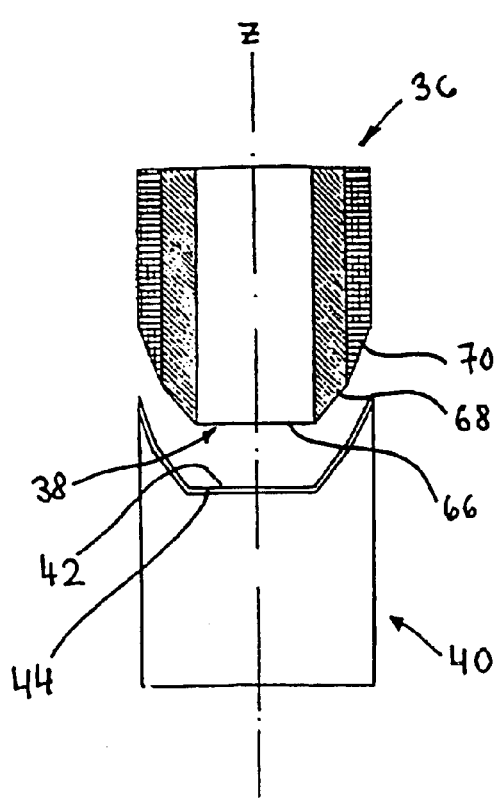
FIG. 5 a longitudinal section through a version of a shaping stem with counter-stem.

The shaping stem 36 shown in FIG. 5 is made up of various parts 66, 68, 70 of materials of different friction coefficients. The surface 38 of the shaping stem 36 effecting the shape forming is comprised of the flat base 66 and the concentric, successively inclined side walls 68, 70. The surface 38 effecting the shaping extends over all of the parts 66, 68, 70. The surface areas 66, 68, 70, effecting the shaping may therefore have different coefficients of friction. For example, the parts 66, 68, 70 are of materials with increasing friction coefficients, whereby the base part 66 exhibits the lowest coefficient of friction.

The shape of the base 42 of the counter-stem 40 coated e.g. with a rubber liner 44 matches that of the shape-effecting surface 38 of the shaping stem 36.

Figure 6:
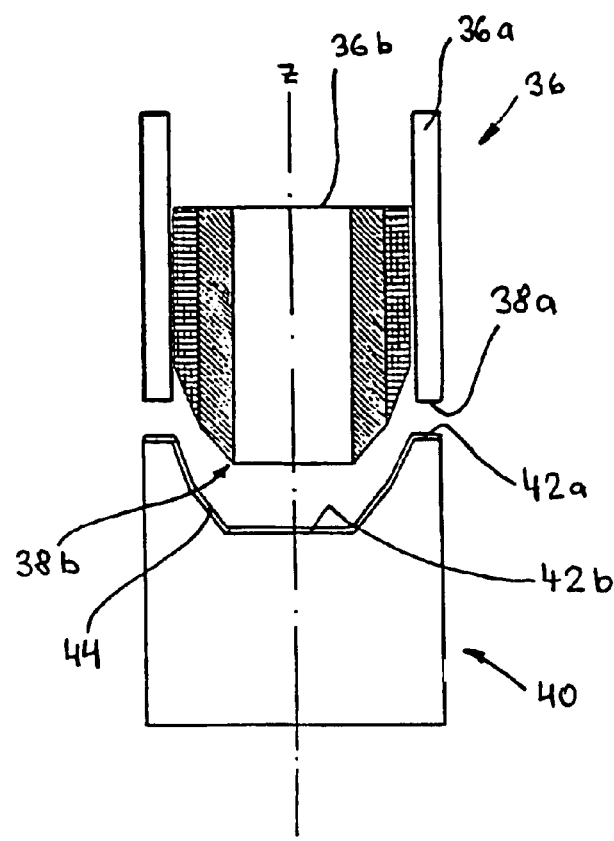
FIG. 6 a longitudinal section through a further version of a shaping stem with counter-stem FIG. 7 a sequence of process steps for manufacturing blister packs.

The version of shaping stem 36 shown in FIG. 6 is telescopic in structure and exhibits a first hollow-cylindrical stem 36a with a first ring-shaped shape-effecting surface 38a. Sliding in this first stem 36a is a moveable second stem 36b with a second shape-effecting surface 38b. This two part shaping stem 36 permits shaping with the shaping stem 36 in two steps. As in FIG. 5, the base 42 of the counter-stem 40 matches the shape-effecting surface of the shaping stem 36, whereby a ring-shaped base part 42a faces the ring-shaped surface 38a of the shaping stem 36 and a further base 42b faces the shape-effecting surface 38b of the inner stem 36b.

Figure 7:
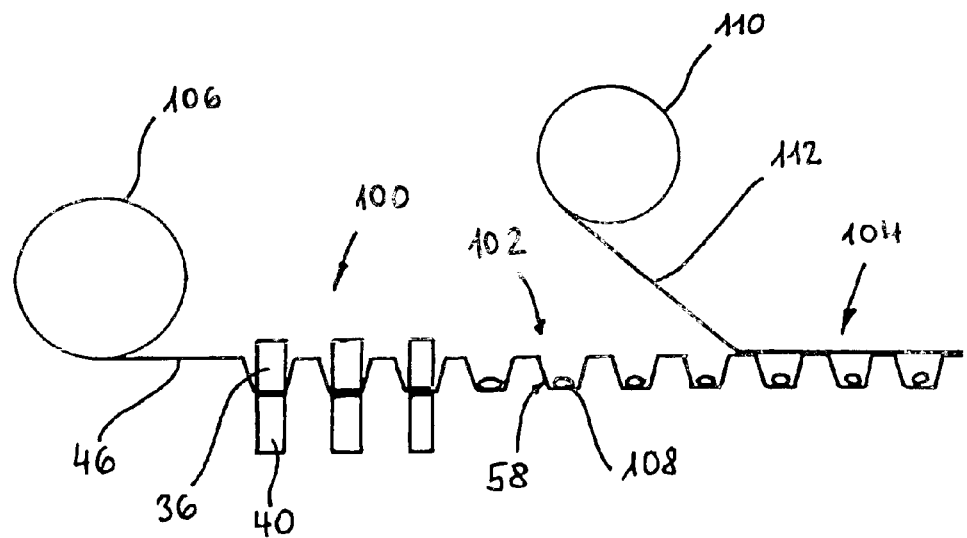

In a process for manufacturing blister packs illustrated in FIG. 7 the metal-plastic composite 46 is unrolled from a roll 106 and fed discontinuously into through a shape forming station 100. In a subsequent filling station 102 the recesses 58 are filed with contents 108 such as e.g. tablets. On advancing the shaped and filled film 46 further, a lid film 112 made e.g. of plastic-coated aluminum foil, unrolled from a storage roll 110, is laid on top of the metal-plastic composite film 46 and sealed to it, producing the finished blister pack. The blister packs made in the form of an endless strip can then be cut into packs of the desired size.

In the following, using the example shown in FIG. 1, the manner in which the shaping stem 36 and counter-stem 40 operate is explained in terms of four examples of shape-forming.

Shape-forming Example 1

The film 46 is held, clamped between the die 12 and the clamping device 16. The shaping stem 36 is advanced until it makes contact with the film 46 at the level of clamping E. On the opposite side, the counter-stem 40 is likewise advanced until it meets the unstretched film 46. Via the piston 20 a preselected pressure is applied, clamping the film 46 between the base 38 of the shaping stem 36 and the base 42 or rubber cover 44 of the counter-stem 40. The force of the shaping stem 36 is chosen to be greater than the force applied by the counter-stem 40. As a result the shaping stem 36 penetrates the die opening 40 and at the same time pushes back the counter-stem 40. In this first shaping step the film is stretched in a controlled manner in the side wall part 60 of the recess 58 being formed, until the forming potential of the film in the side wall part 60 is exhausted. After the elongation of the side wall part 60, the piston 20 is drawn back along with the counter-stem 40 into its original position. In a second shaping step, the base part 62 of the recess 58 being formed is shaped by advancing the shaping stem 36 against the film 46 which up to then had been clamped against the base 42 of the counter-stem 40.

Shape-forming Example 2

The film 46 is held, clamped between the die 12 and the clamping device 16. The piston 20 along with the counter-stem 40 is thereby withdrawn to its starting position. The shaping stem 36 is advanced into the die opening 14 up to a pre-selected position in which the full shape-forming potential in the base part 62 of the recess 58 being formed is reached. In this first shape-forming step the film 46 is stretched mainly in the base part 62. In a second step the piston 20 along with the counter-stem 40 is advanced with pre-selected pressure towards the shaping stem 36 and onto the film 46 resting on the base 38 of the shaping stem 36. Thereby, that part of the film 46 which forms the base part 62 of the recess 58 being formed is held, clamped between the base 38 of the shaping stem 36 and the base 42 or the rubber cover 44 of the counter-stem. The force of the shaping stem 36 is now chosen to be greater than that of the counter-stem 40. The shaping stem 36 and the counter-stem 40 move therefore with the clamped film 46 towards the base 25 of the die 12, whereby the side wall part 60 of the recess 58 being formed is stretched until the shaping potential of the film in the side wall part 60 has been fully exploited. When the shaping potential of the film 46 has been fully exploited, the shaping stem 36 and the counter-stem 40 move back to their starting positions.

Shape-forming Example 3

The film 46 is held, clamped between the die 12 and the clamping facility 16. The shaping stem 36 is moved back to its starting position. The counter-stem 40 moves to that position in the clamping device opening 18 at which the potential for shape forming the film in the base part 62 of the recess being formed has been fully exploited. Thereby, the base 42 of the counter-stem 40 exhibits a surface with a high coefficient of friction, with the result that the shape-forming potential of the film in the side wall part 60 of the recess 58 being formed is fully exploited in this first shape-forming step. After exhausting the shape-forming potential of the film in the side wall part 60, the piston 20 is drawn back again to the starting position along with the counter-stem 40. In a second shape-forming step the shape-forming stem 36 is moved into the die opening 14 until the shape-forming potential of the film in the base part 62 of the recess 58 being formed has been exhausted. To this end the surface of the base 38 of the shaping stem 36 exhibits a low coefficient of friction. In the first shaping step the film 46 may also be clamped between the shaping stem 36 and the counter-stem 40.

Shape-forming Example 4

The film 46 is held, clamped between the die 12 and the clamping facility 16. The shaping stem 36 is moved back to its starting position. The piston 20 with the counter-stem 40 is moved to a pre-selected position in the clamping device opening 18 at which the shape-forming potential of the film 46 in the base part 62 of the recess 58 being formed has been fully exploited. To that end the surface of the base 42 of the counter-stem 40 exhibits a low coefficient of friction. After this first shape-forming step the piston with the counter-stem 40 is moved back to its starting position. In a second shape-forming step the shaping stem 36, the base 38 of which has a surface with a high coefficient of friction is moved to a pre-selected position in the die opening 14 until the shape-forming potential of the film in the side wall part 60 has been exhausted. In the second shape-forming step the film 46 may also be clamped between the shaping stem 36 and the counter-stem 40.

I claim:

1. A device for shape-forming at least one recess in a film material comprises: a die with at least one opening therein; at least one shaping stem operative to be introduced into said opening to create said recess by shape-forming; a clamping facility for holding the film material fast between the clamping facility and the die; and at least one counter-stem situated in said die and displaceable at least within the die opening wherein the shape-forming region of the shaping stem and the counter-stem at least partially superimpose on each other for clamping the film material therebetween, and further including means for moving the shaping stem and the counter-stem in the same direction while clamping the film material during at least a portion of the shape forming of the at least one recess.

2. A device according to claim 1, wherein the counter-stem is situated on a piston which can be displaced into the die along an axis (z) of deformation.

3. A device according to claim 2, wherein the piston includes means for indicating piston position.

4. A device according to claim 2, wherein piston defines with the die a cylindrical space and fluid from control means is connected to the cylindrical space for feeding and removing hydraulic fluid thereto for selectively biasing the position.

5. A device according to claim 1, wherein surfaces of the shape-forming region on the shaping stem and the counter-stem exhibit different coefficients of friction.

6. A device according to claim 1, wherein surfaces of the shape-forming region of the shaping stem and the counter-stem exhibit locally different coefficients of friction.

7. A device according to claim 1, including a plurality of shaping stems and counter-stems, wherein at least one of the shaping stems and the counter-stems are made up in two parts comprising a hollow, cylindrical outer stem part and an inner stem that can be slid in a telescopic manner out of the outer stem part.

8. A device according to claim 1, wherein adjacent a clamping area, at the edges of the die openings and the clamping facility, both the die and the clamping facility exhibit a substrate of material of low coefficient of friction for guiding the film material.

9. A device according to claim 1, wherein the film material comprises a metal foil coated with plastic.

10. A device according to claim 1, wherein the film material comprises a metal-plastic composite.

11. A device according to claim 10, wherein the film material comprises a plastic coated metal foil.

12. A device according to claim 1, including a plurality of shaping stems and a plurality of counter-stems to simultaneously shape-form a plurality of recesses in said film material.

13. A device according to claim 12, wherein the film material with the plurality of recess forms a base part of a blister pack.

* * * * *